US012596518B2

(12) United States Patent　　　(10) Patent No.:　US 12,596,518 B2
Takemoto　　　　　　　　　　　　(45) Date of Patent:　Apr. 7, 2026

(54) MICROPHONE INTERFACE, VEHICLE, CONNECTION METHOD, AND PRODUCTION METHOD

(71) Applicant: Panasonic Intellectual Property Management Co., Ltd., Osaka (JP)

(72) Inventor: Makoto Takemoto, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 143 days.

(21) Appl. No.: 18/442,631

(22) Filed: Feb. 15, 2024

(65) Prior Publication Data

US 2024/0281195 A1　Aug. 22, 2024

(30) Foreign Application Priority Data

Feb. 17, 2023　(JP) ................................. 2023-023758

(51) Int. Cl.
H04R 3/00　　　(2006.01)
G06F 3/16　　　(2006.01)
(52) U.S. Cl.
CPC .............. G06F 3/162 (2013.01); H04R 3/00 (2013.01); *H04R 2499/13* (2013.01)
(58) Field of Classification Search
CPC ....... G06F 3/162; H04R 3/00; H04R 2499/13; H04R 2410/00

USPC ................................................. 381/111, 122
See application file for complete search history.

(56) References Cited

U.S. PATENT DOCUMENTS

| | | | |
|---|---|---|---|
| 2013/0124763 A1 | 5/2013 | Kessler | |
| 2015/0110300 A1* | 4/2015 | Florian | ................... G06F 3/162 |
| | | | 381/122 |
| 2016/0086593 A1* | 3/2016 | Kim | ................. G10K 11/17821 |
| | | | 381/71.4 |
| 2018/0217805 A1* | 8/2018 | Uong | ....................... H04R 3/00 |

FOREIGN PATENT DOCUMENTS

JP　　　　2014534686 A　　12/2014

* cited by examiner

*Primary Examiner* — George C Monikang
(74) *Attorney, Agent, or Firm* — Seed Intellectual Property Law Group LLP

(57)　　　　　　　ABSTRACT

A microphone interface of the present disclosure includes: a connection terminal usable as an audio input terminal into which an audio signal is input or as a power supply terminal connected to a power supply; and a ground side terminal provided on a ground side with respect to the connection terminal. When a two-wire microphone is connected to the microphone interface, the connection terminal is used as the audio input terminal, and when a three-wire microphone is connected to the microphone interface, the connection terminal is used as the power supply terminal for supplying electric power to the three-wire microphone.

10 Claims, 8 Drawing Sheets

MICROPHONE INTERFACE, VEHICLE, CONNECTION METHOD, AND PRODUCTION METHOD

TECHNICAL FIELD

The present disclosure relates to a microphone interface, a vehicle, a connection method, and a production method.

BACKGROUND ART

Conventionally, examples of microphones include two-wire microphones that use two terminals and three-wire microphones that use three terminals.

In addition, examples of the two-wire microphones include differential input two-wire microphones and single-ended input two-wire microphones.

CITATION LIST

Patent Literature

PTL 1

Japanese Unexamined Patent Application Publication (Translation of PCT Application) No. 2014-534686

SUMMARY OF INVENTION

When a corresponding microphone interface is provided for each type of microphone, a large number of microphone interfaces would be required, resulting in a large burden on manufacturing costs and inventory management.

Non-limiting examples of the present disclosure facilitate providing an interface for a microphone (herein simply referred to as "microphone interface") compatible with a plurality of types of microphone.

A microphone interface according to an embodiment of the present disclosure includes: a connection terminal usable as an audio input terminal into which an audio signal is input or as a power supply terminal connected to a power supply; and a ground side terminal provided on a ground side with respect to the connection terminal, in which when a two-wire microphone is connected to the microphone interface, the connection terminal is used as the audio input terminal, and when a three-wire microphone is connected to the microphone interface, the connection terminal is used as the power supply terminal for supplying electric power to the three-wire microphone.

A method for connecting a microphone according to an embodiment of the present disclosure includes: using a connection terminal as an audio input terminal when the microphone to be connected is a two-wire microphone; and using the connection terminal as a power supply terminal when the microphone to be connected is a three-wire microphone.

A method for producing a microphone interface according to an embodiment of the present disclosure includes: forming a connection terminal that allows connection of a two-wire microphone and a three-wire microphone thereto, and a ground side terminal to be provided on a ground side with respect to the connection terminal; and for the connection of the two-wire microphone, mounting the connection terminal as an audio input terminal, and for the connection of the three-wire microphone, mounting the connection terminal as a power supply terminal.

The present invention is capable of providing a compact microphone interface that is commonly available regardless of microphone type.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
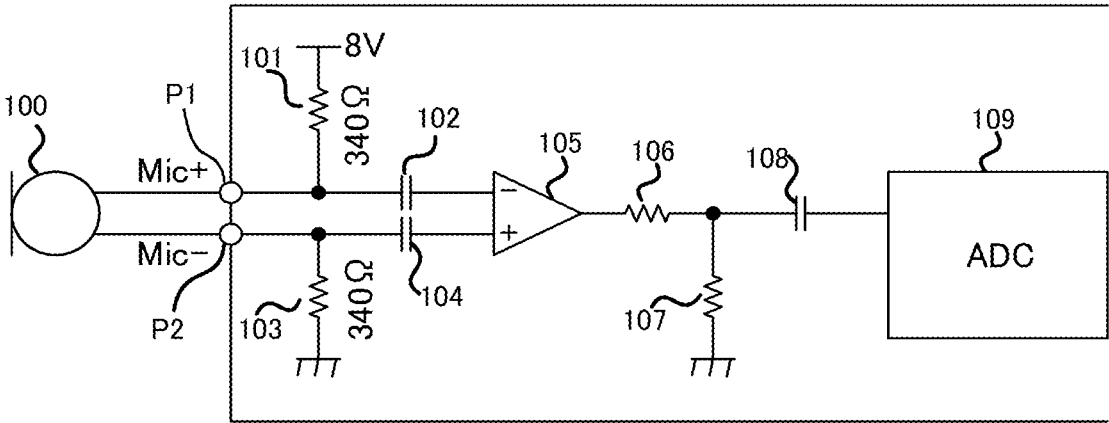
FIG. 1 illustrates a typical microphone interface when a differential input two-wire microphone is connected thereto.

FIG. 1 illustrates a typical microphone interface when differential input two-wire microphone 100 is connected thereto.

Differential input two-wire microphone 100 includes two lines, namely output line Mic+ and output line Mic−. Output line Mic+ and output line Mic− are respectively connected to first terminal P1 and second terminal P2 of the microphone interface.

First terminal P1 is connected to one end of first resistor 101 of 340Ω and one end of first capacitor 102. The other end of first resistor 101 is connected to an 8V power supply. The other end of first capacitor 102 is connected to the inverting input of differential amplifier 105.

Second terminal P2 is connected to one end of second resistor 103 of 340Ω and one end of second capacitor 104. The other end of second resistor 103 is grounded. The other end of second capacitor 104 is connected to the non-inverting input of differential amplifier 105.

The output of differential amplifier 105 is connected to one end of third resistor 106. The other end of third resistor 106 is connected to one end of fourth resistor 107 and one end of third capacitor 108. The other end of fourth resistor 107 is grounded. The other end of third capacitor 108 is connected to analog digital converter (ADC) 109.

Figure 2:
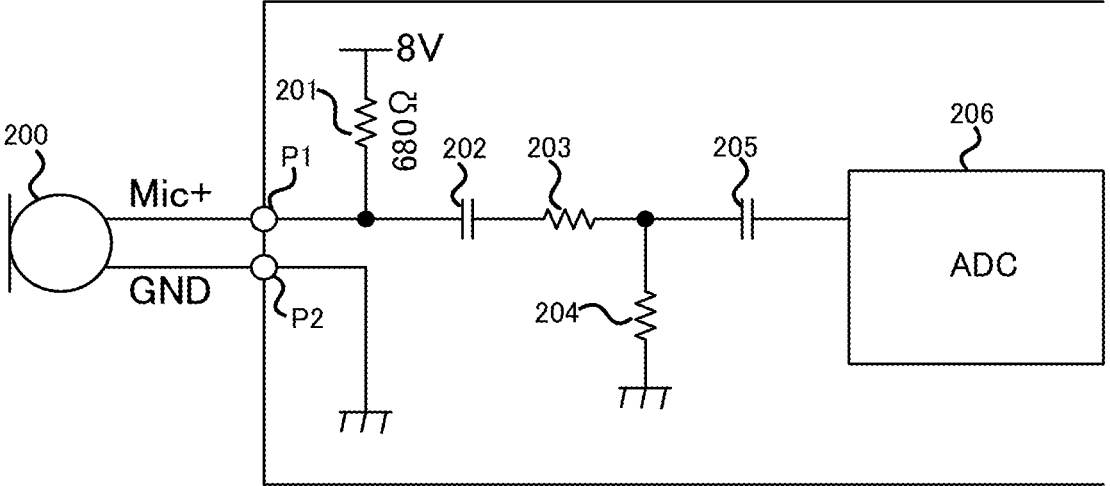
FIG. 2 illustrates a typical microphone interface when a single-ended input two-wire microphone is connected thereto.

FIG. 2 illustrates a typical microphone interface when single-ended input two-wire microphone 200 is connected thereto.

Single-ended input two-wire microphone 200 includes two lines, namely output line Mic+ and ground line GND. Output line Mic+ and ground line GND are respectively connected to first terminal P1 and second terminal P2 of the microphone interface.

First terminal P1 is connected to one end of first resistor 201 of 680Ω and one end of first capacitor 202. The other end of first resistor 201 is connected to an 8V power supply. The other end of first capacitor 202 is connected to one end of second resistor 203. The other end of second resistor 203 is connected to one end of third resistor 204 and one end of second capacitor 205. The other end of third resistor 204 is grounded. The other end of second capacitor 205 is connected to analog digital converter 206.

Second terminal P2 is grounded (regarding the above description, see, for example, Patent Literature (hereinafter, referred to as PTL) 1).

Figure 3:
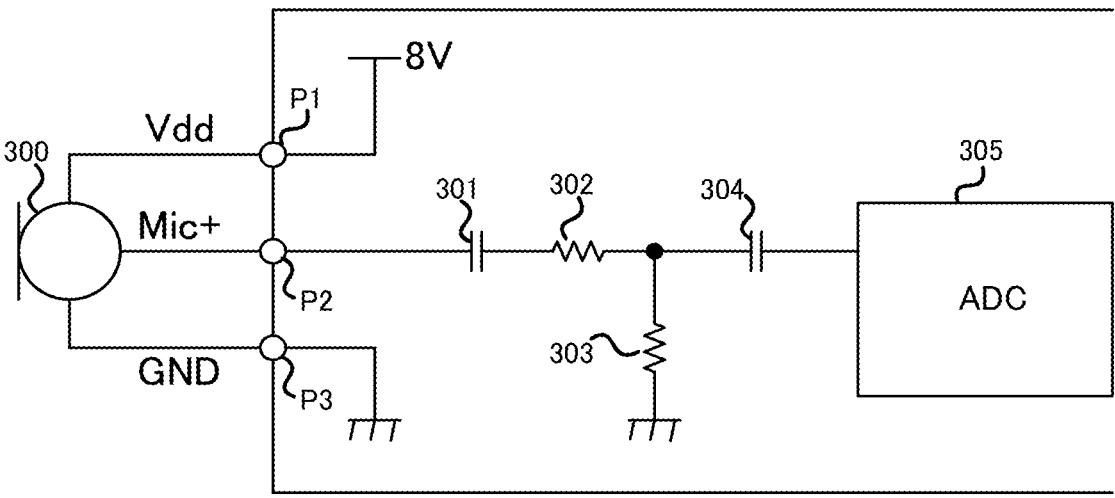
FIG. 3 illustrates a typical microphone interface when a three-wire microphone is connected thereto.

FIG. 3 illustrates a typical microphone interface when three-wire microphone 300 is connected thereto.

Three-wire microphone 300 includes three lines, namely power supply line Vdd, output line Mic+, and ground line GND. Power supply line Vdd, output line Mic+, and ground line GND are respectively connected to first terminal P1, second terminal P2, and third terminal P3 of the microphone interface.

First terminal P1 is connected to an 8V power supply.

Second terminal P2 is connected to one end of first capacitors 301. The other end of first capacitor 301 is connected to one end of first resistor 302. The other end of first resistor 302 is connected to one end of second resistor 303 and one end of second capacitor 304. The other end of second resistor 303 is grounded. The other end of second capacitor 304 is connected to analog digital converter 305.

Third terminal P3 is grounded.

The output of the analog digital converter in each of FIGS. 1 to 3 is connected to a signal processing circuit (such as digital signal processor (DSP), not illustrated), and the signal processing circuit performs signal processing suitable for an application. Examples of the application include voice recognition, hands-free calling, and in-car communication (ICC). Examples of the signal processing includes noise canceller, echo canceller, voice recognition, directional control, Bluetooth connection, and speaker connection.

Figure 4:
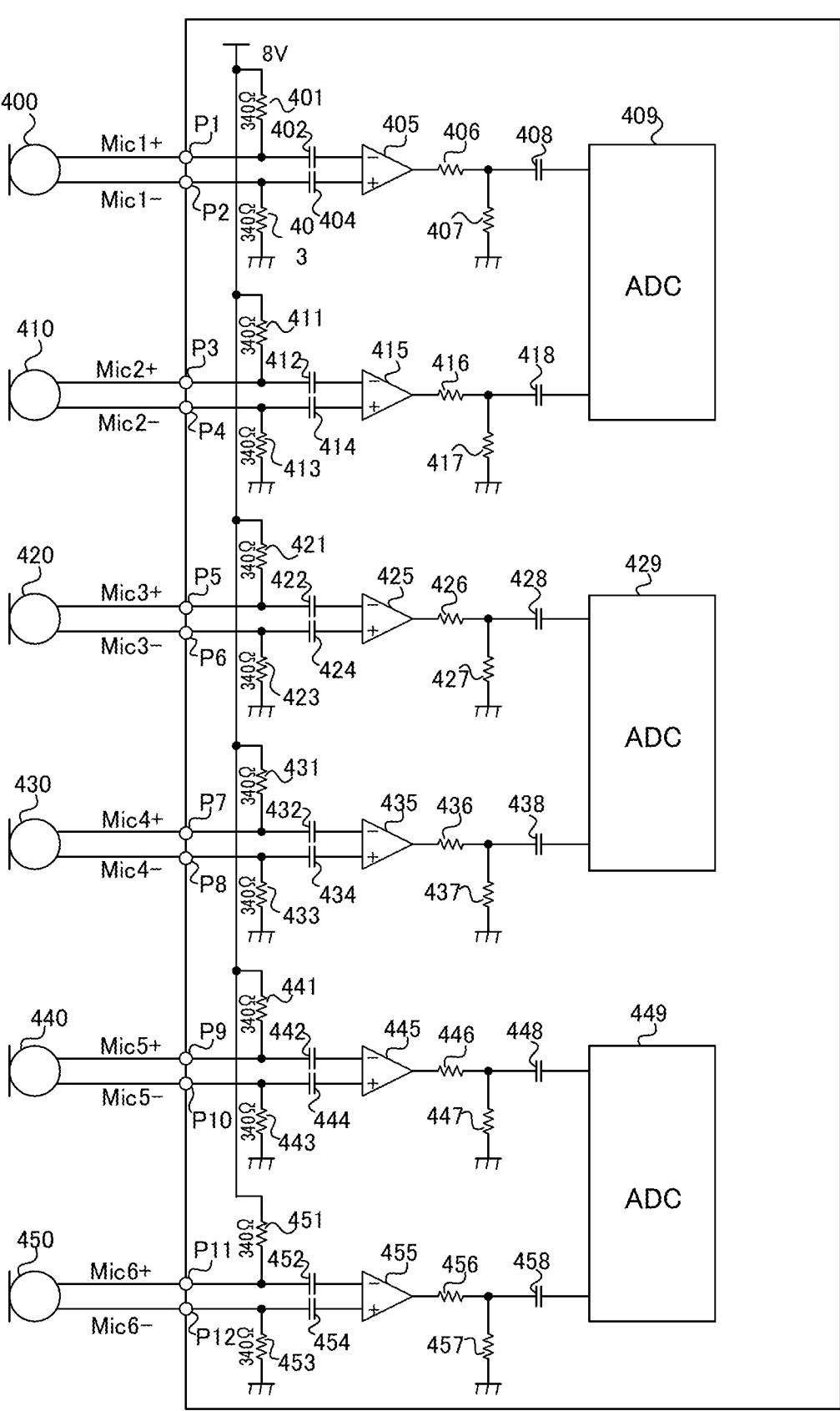
FIG. 4 illustrates a typical microphone interface with six differential input two-wire microphones connected thereto.
Figure 5:
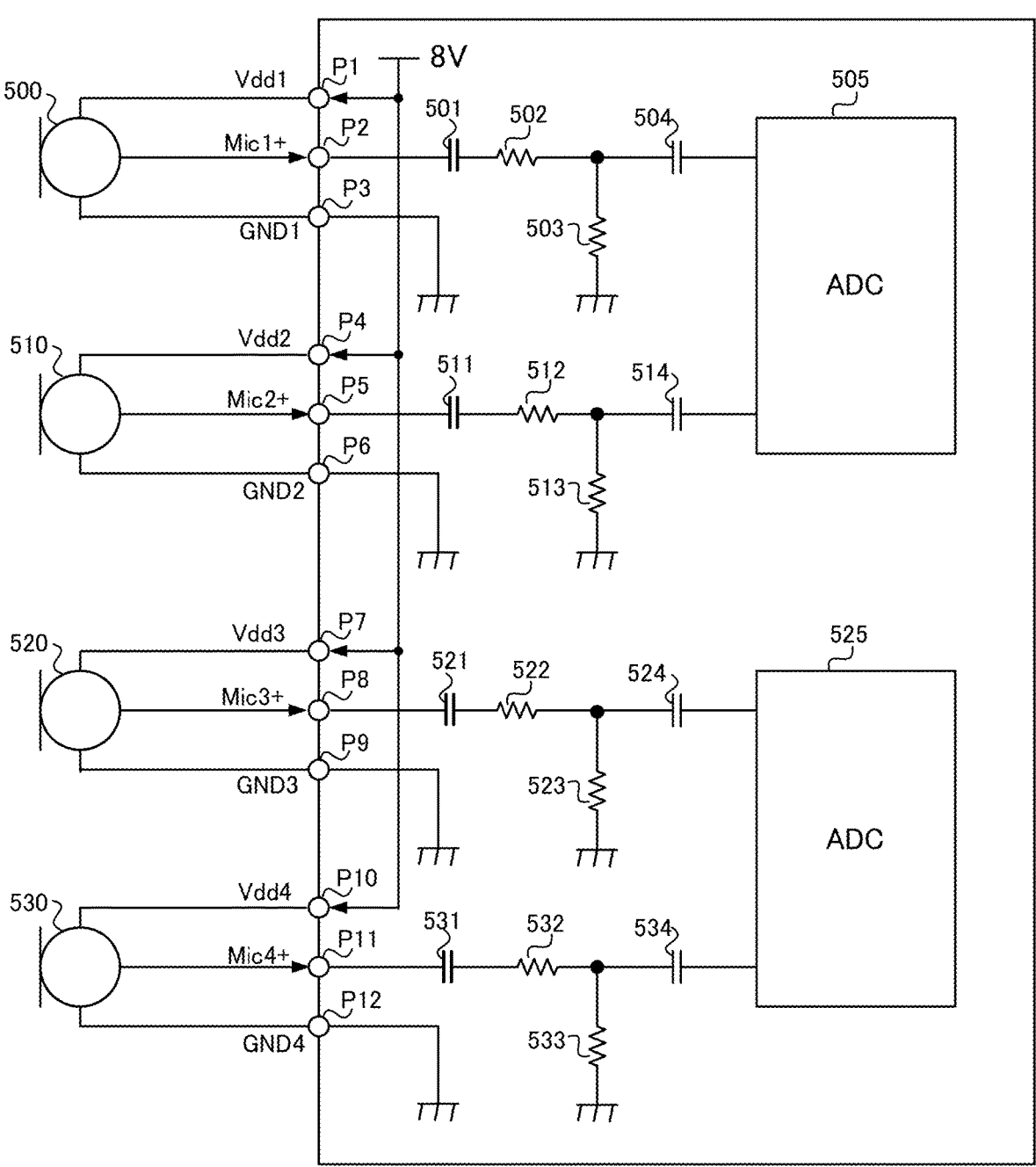
FIG. 5 illustrates a typical microphone interface with four three-wire microphones connected thereto.

As ICC becomes popular, it has become necessary to install a plurality of microphones in a vehicle. FIG. 4 illustrates a typical microphone interface when six differential input two-wire microphones are connected thereto. FIG. 5 illustrates a typical microphone interface when four three-wire microphones are connected thereto.

As illustrated in FIG. 4, output line Mic1+ and output line Mic1– of first microphone 400 are respectively connected to terminals P1 and P2 of the microphone interface.

Output line Mic2+ and output line Mic2– of second microphone 410 are respectively connected to terminals P3 and P4 of the microphone interface.

Output line Mic3+ and output line Mic3– of third microphone 420 are respectively connected to terminals P5 and P6 of the microphone interface.

Output line Mic4+ and output line Mic4– of fourth microphone 430 are respectively connected to terminals P7 and P8 of the microphone interface.

Output line Mic5+ and output line Mic5– of fifth microphone 440 are respectively connected to terminals P9 and P10 of the microphone interface.

Output line Mic6+ and output line Mic6– of sixth microphone 450 are respectively connected to terminals P11 and P12 of the microphone interface.

Terminals P1, P3, P5, P7, P9, and P11 are respectively connected to one ends of first resistors 401, 411, 421, 431, 441, and 451 of 340Ω, and to one ends of first capacitors 402, 412, 422, 432, 442, and 452.

The other ends of first resistors 401, 411, 421, 431, 441, and 451 are all connected to an 8V power supply. The other ends of first capacitors 402, 412, 422, 432, 442, and 452 are respectively connected to the inverting inputs of differential amplifiers 405, 415, 425, 435, 445, and 455.

Terminals P2, P4, P6, P8, P10, and P12 are respectively connected to one ends of third resistors 403, 413, 423, 433, 443, and 453 of 340Ω, and to one ends of second capacitors 404, 414, 424, 434, 444, and 454.

The other ends of third resistors 403, 413, 423, 433, 443, and 453 are all grounded. The other ends of second capacitors 404, 414, 424, 434, 444, and 454 are respectively connected to non-inverting inputs of differential amplifiers 405, 415, 425, 435, 445, and 455.

The outputs of differential amplifiers 405, 415, 425, 435, 445, and 455 are respectively connected to one ends of third resistors 406, 416, 426, 436, 446, and 456.

The other ends of third resistors 406, 416, 426, 436, 446, and 456 are respectively connected to one ends of fourth resistors 407, 417, 427, 437, 447, and 457, and to one ends of third capacitor 408, 418, 428, 438, 448, and 458.

The other ends of fourth resistors 407, 417, 427, 437, 447, and 457 are all grounded. The other ends of third capacitors 408 and 418 are respectively connected to the inputs of first analog digital converter 409.

The other ends of third capacitors 428 and 438 are respectively connected to the inputs of second analog digital converter 429. The other ends of third capacitors 448 and 458 are respectively connected to the inputs of third analog digital converter 449.

FIG. 5 illustrates a microphone interface with four three-wire microphones connected thereto.

Power supply line Vdd1, output line Mic1+, and ground line GND1 of first microphone 500 are respectively connected to terminals P1, P2, and P3 of the microphone interface.

Power supply line Vdd2, output line Mic2+, and ground line GND2 of second microphone 510 are respectively connected to terminals P4, P5, and P6 of the microphone interface.

Power supply line Vdd3, output line Mic3+, and ground line GND3 of third microphone 520 are respectively connected to terminals P7, P8, and P9 of the microphone interface.

Power supply line Vdd4, output line Mic4+, and ground line GND4 of fourth microphone 530 are respectively connected to terminals P10, P11, and P12 of the microphone interface.

Terminals P1, P4, P7, and P10 are all connected to an 8V power supply. Terminals P2, P5, P8, and P11 are respectively connected to one ends of first capacitors 501, 511, 521, and 531.

The other ends of first capacitors 501, 511, 521, and 531 are respectively connected to one ends of first resistors 502, 512, 522, and 532.

The other ends of first resistors 502, 512, 522, and 532 are respectively connected to one ends of second resistors 503, 513, 523, and 533, and to one ends of second capacitors 504, 514, 524, and 534. The other ends of second resistors 503, 513, 523, and 533 are all grounded.

The other ends of second capacitors 504 and 514 are connected to first analog digital converter 505. The other ends of second capacitors 524 and 534 are connected to second analog digital converter 525.

Terminals P3, P6, P9, and P12 are all grounded.

The circuit in FIG. 4 and the circuit in FIG. 5 have the same overall number of terminals, but differ in the number of grounded terminals.

Grounding is one of the most important configurations of a circuit board; thus, the circuit board is generally grounded in advance in an interface. That is, it is difficult to change a grounded terminal (for example, terminal P3, P6, P9, or P12 in FIG. 5) to be not grounded.

Therefore, even when the numbers of terminals to be used in microphone interfaces are the same, it is difficult to use one type of microphone interface for different types of microphones. For this reason, one type of microphone interface has been prepared for each type of microphone.

For the comparison to a microphone interface of the present application, the following describes a microphone interface configured to be able to connect to a two-wire microphone and also to a three-wire microphone by simply increasing the number of terminals.

Figure 6:
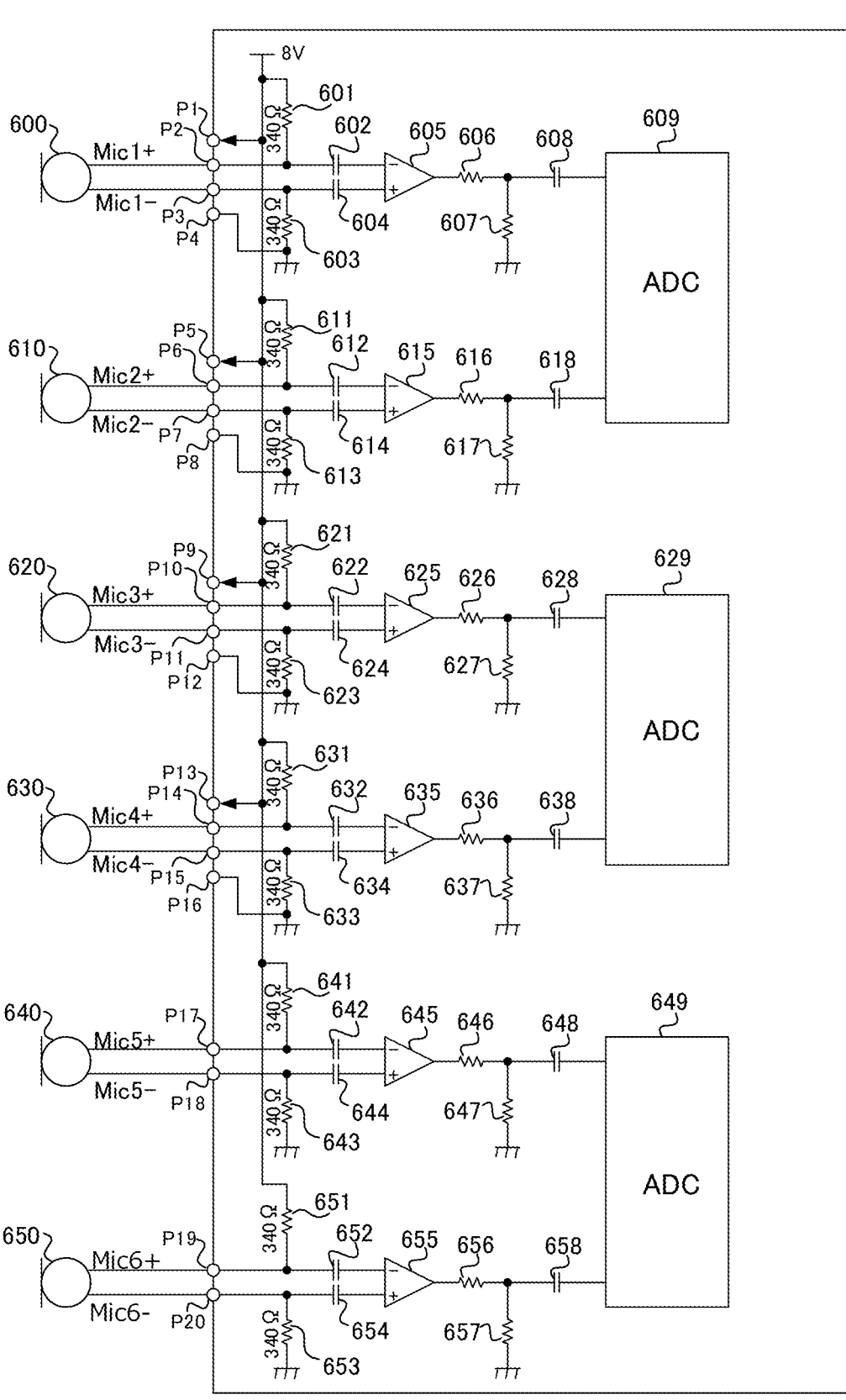
FIG. 6 illustrates a microphone interface of a comparative example with six differential input two-wire microphones connected thereto.
Figure 7:
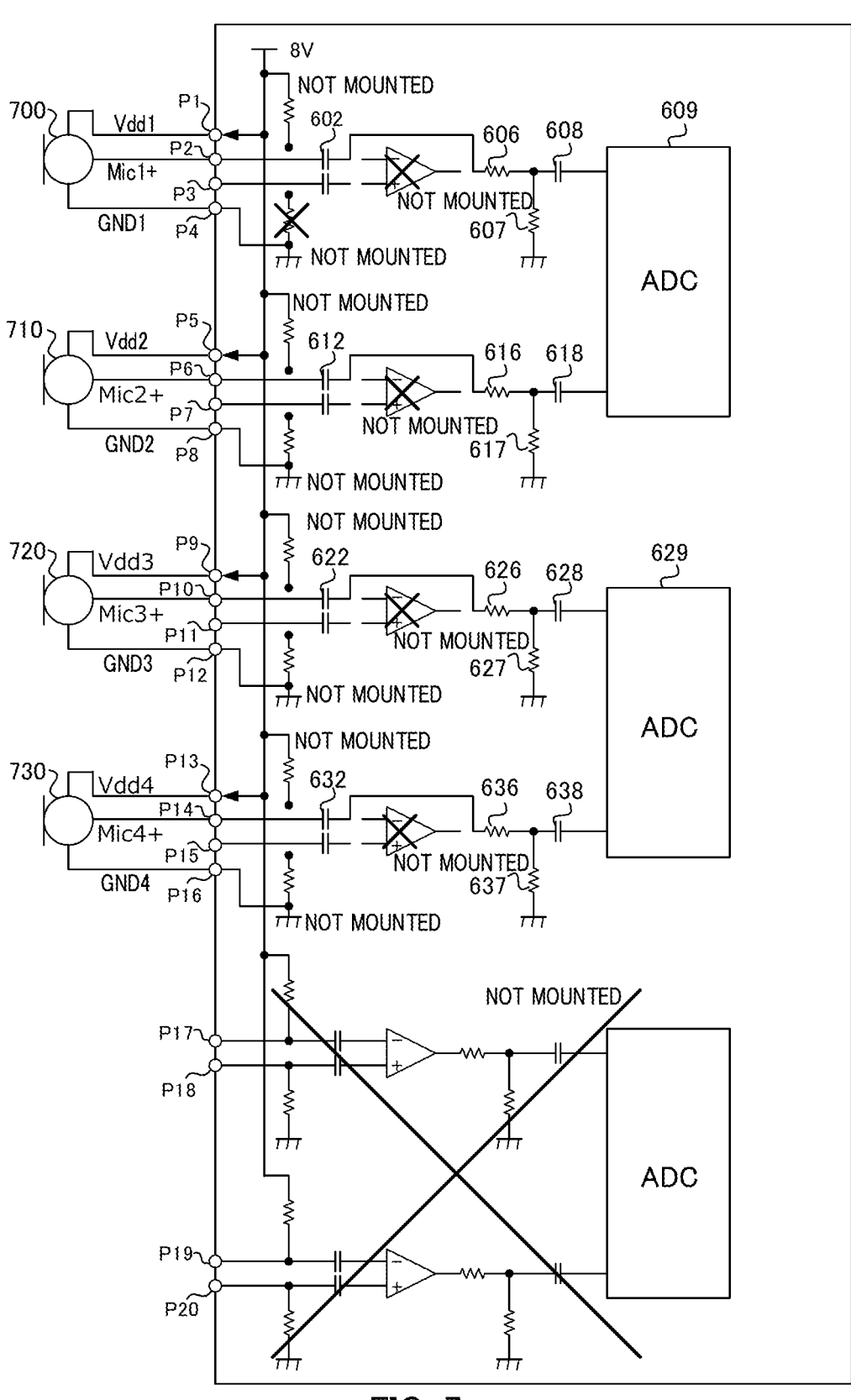
FIG. 7 illustrates a microphone interface of a comparative example with four three-wire microphones connected thereto.

FIG. 6 illustrates a microphone interface of a comparative example with six differential input two-wire microphones connected thereto. In addition, FIG. 7 illustrates a microphone interface of a comparative example with four three-wire microphones connected thereto.

As illustrated in FIG. 6, output line Mic1+ and output line Mic1− of first microphone 600 are respectively connected to terminals P2 and P3 of the microphone interface.

Output line Mic2+ and output line Mic2− of second microphone 610 are respectively connected to terminals P6 and P7 of the microphone interface.

Output line Mic3+ and output line Mic3− of third microphone 620 are respectively connected to terminals P10 and P11 of the microphone interface.

Output line Mic4+ and output line Mic4− of fourth microphone 630 are respectively connected to terminals P14 and P15 of the microphone interface.

Output line Mic5+ and output line Mic5− of fifth microphone 640 are respectively connected to terminals P17 and P18 of the microphone interface.

Output line Mic6+ and output line Mic6− of sixth microphone 650 are respectively connected to terminals P19 and P20 of the microphone interface.

Terminals P2, P6, P10, P14, P17, and P19 are respectively connected to one ends of first resistors 601, 611, 621, 631, 641, and 651 of 340Ω, and to one ends of first capacitors 602, 612, 622, 632, 642, and 652.

The other ends of first resistors 601, 611, 621, 631, 641, and 651 are all connected to an 8V power supply. The other ends of first capacitors 602, 612, 622, 632, 642, and 652 are respectively connected to the inverting inputs of differential amplifiers 605, 615, 625, 635, 645, and 655.

Terminals P3, P7, P11, P15, P18, and P20 are respectively connected to one ends of second resistors 603, 613, 623, 633, 643, and 653 of 340Ω, and to one ends of second capacitors 604, 614, 624, 634, 644, and 654.

The other ends of second resistors 603, 613, 623, 633, 643, and 653 are all grounded. The other ends of second capacitors 604, 614, 624, 634, 644, and 654 are respectively connected to non-inverting inputs of differential amplifiers 605, 615, 625, 635, 645, and 655.

The outputs of differential amplifiers 605, 615, 625, 635, 645, and 655 are respectively connected to one ends of third resistors 606, 616, 626, 636, 646, and 656.

The other ends of third resistors 606, 616, 626, 636, 646, and 656 are respectively connected to one ends of fourth resistors 607, 617, 627, 637, 647, and 657, and to one ends of third capacitor 608, 618, 628, 638, 648, and 658.

The other ends of fourth resistors 607, 617, 627, 637, 647, and 657 are all grounded.

The other ends of third capacitors 608 and 618 are both connected to first analog digital converter 609. The other ends of third capacitors 628 and 638 are both connected to second analog digital converter 629. The other ends of third capacitors 648 and 658 are both connected to third analog digital converter 649.

As illustrated in FIG. 7, power supply line Vdd1, output line Mic1+, and ground line GND1 of first microphone 700 are respectively connected to terminals P1, P2, and P4 of the microphone interface.

Power supply line Vdd2, output line Mic2+, and ground line GND2 of second microphone 710 are respectively connected to terminals P5, P6, and P8 of the microphone interface.

Power supply line Vdd3, output line Mic3+, and ground line GND3 of third microphone 720 are respectively connected to terminals P9, P10, and P12 of the microphone interface.

Power supply line Vdd4, output line Mic4+, and ground line GND4 of fourth microphone 730 are respectively connected to terminals P13, P14, and P16 of the microphone interface.

Terminals P1, P5, P9, and P13 are all connected to an 8V power supply.

Terminals P2, P6, P10, and P14 are respectively connected to one ends of first capacitors 602, 612, 622, and 632.

The other ends of first capacitors 602, 612, 622, and 632 are respectively connected to one ends of third resistors 606, 616, 626, and 636.

The other ends of third resistors 606, 616, 626, and 636 are respectively connected to one ends of fourth resistors 607, 617, 627, and 637, and to one ends of third capacitors 608, 618, 628, and 638.

The other ends of fourth resistors 607, 617, 627, and 637 are all grounded.

The other ends of third capacitors 608 and 618 are both connected to first analog digital converter 609. The other ends of third capacitors 628 and 638 are both connected to second analog digital converter 629.

Terminals P4, P8, P12, and P16 are all grounded.

As illustrated in FIGS. 4 and 5, six two-wire microphones uses only 12 terminals in total and four three-wire microphones also uses only 12 terminals in total.

However, the number of interface terminals of a microphone interface configured to be able to connect to a two-wire microphone and also to a three-wire microphone increases to 20 as illustrated in FIGS. 6 and 7 from the following reasons: even when input lines Mic+ are shared, it is necessary to provide terminals to which ground lines GND are connected; it is necessary to provide terminals to which power supply lines Vdd of three-wire microphones are connected; and it is necessary to provide terminals to which input lines Mic− of differential input two-wire microphones are connected.

Therefore, a microphone interface as in the comparative example illustrated in FIGS. 6 and 7 is difficult to reduce the size thereof. As a result, one type of microphone interface has been used for each type of microphone.

Figure 8:
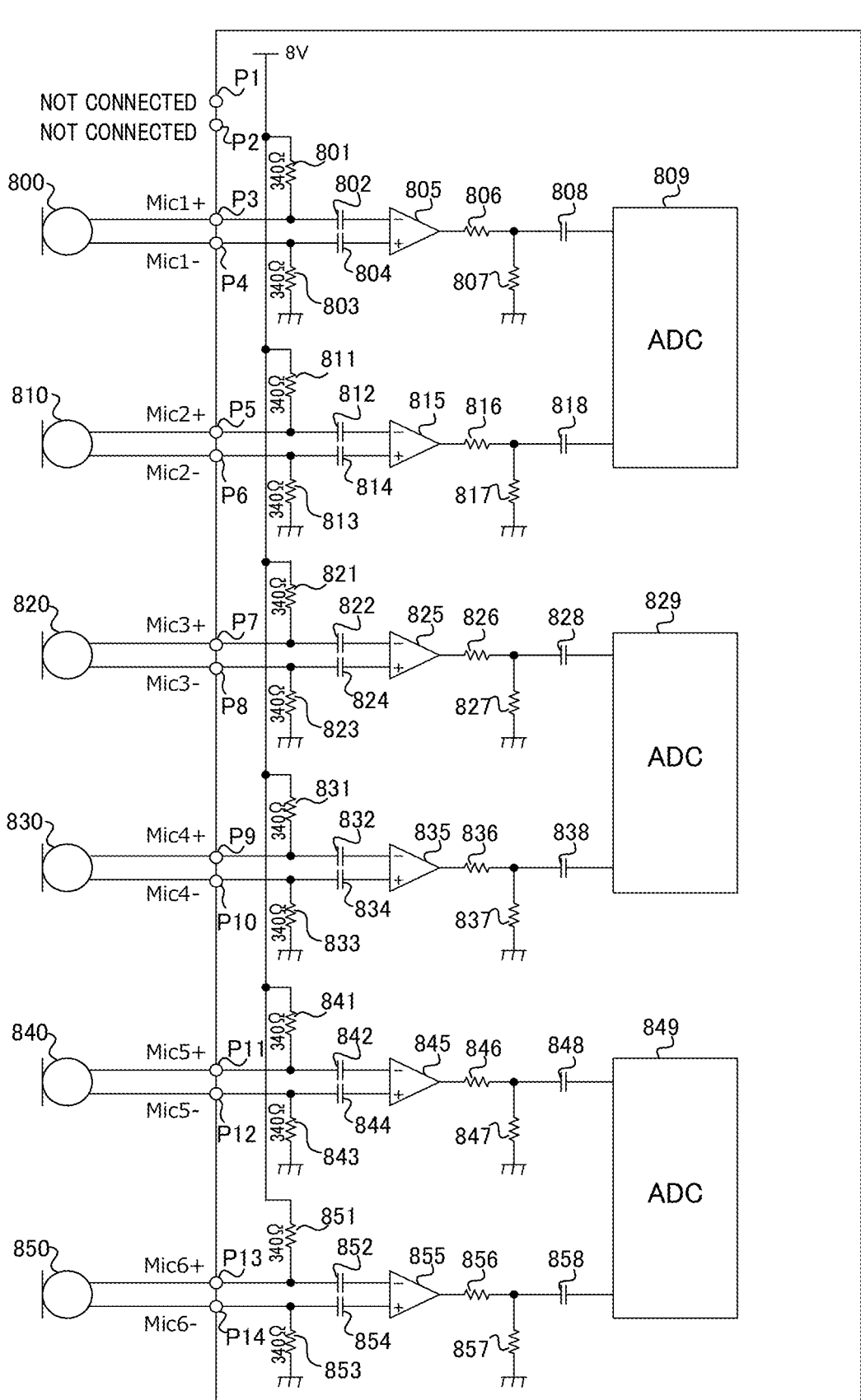
FIG. 8 illustrates a microphone interface of the present disclosure with six differential input two-wire microphones connected thereto.
Figure 9:
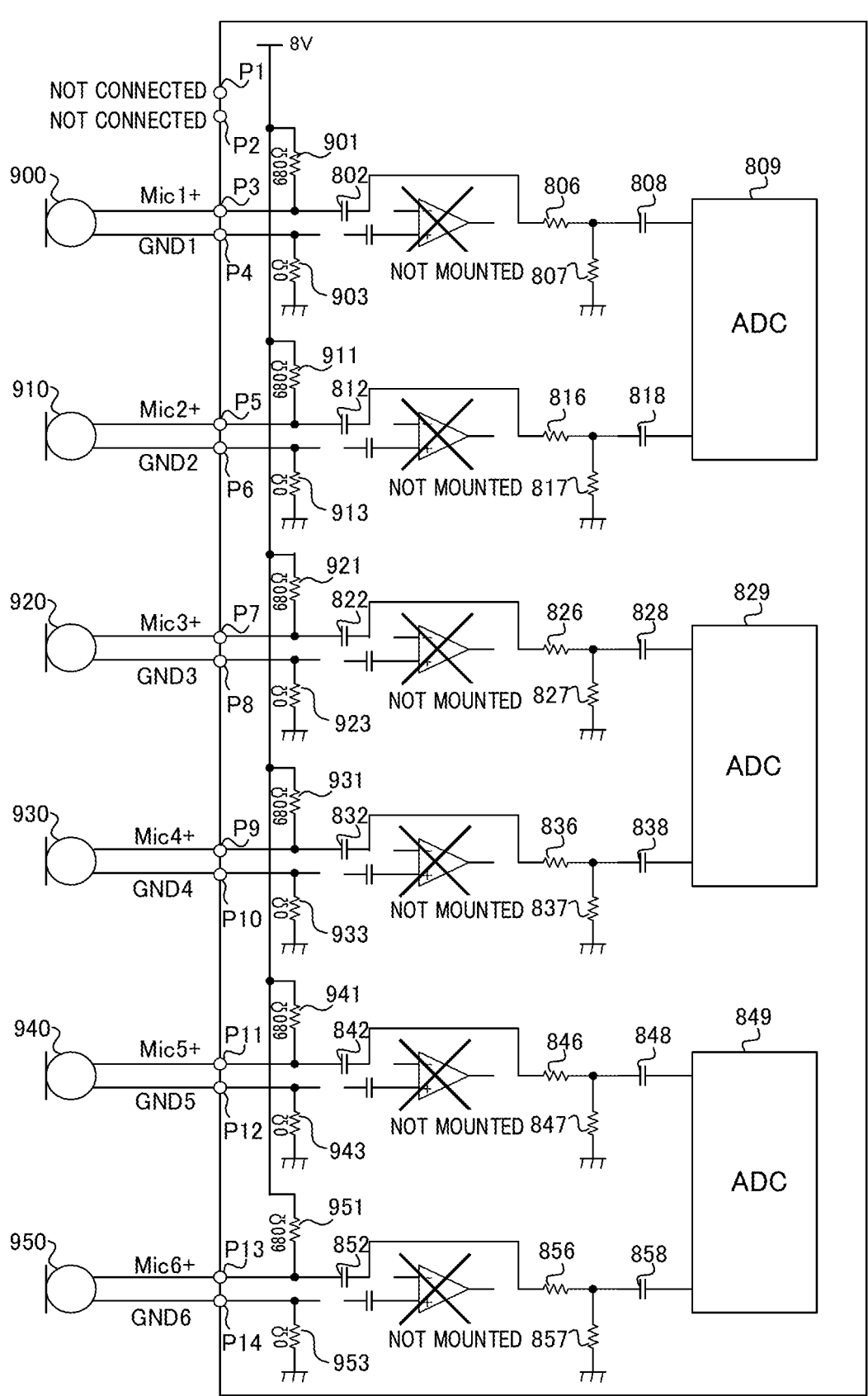
FIG. 9 illustrates a microphone interface of the present disclosure with six single-ended input two-wire microphones connected thereto.
Figure 10:
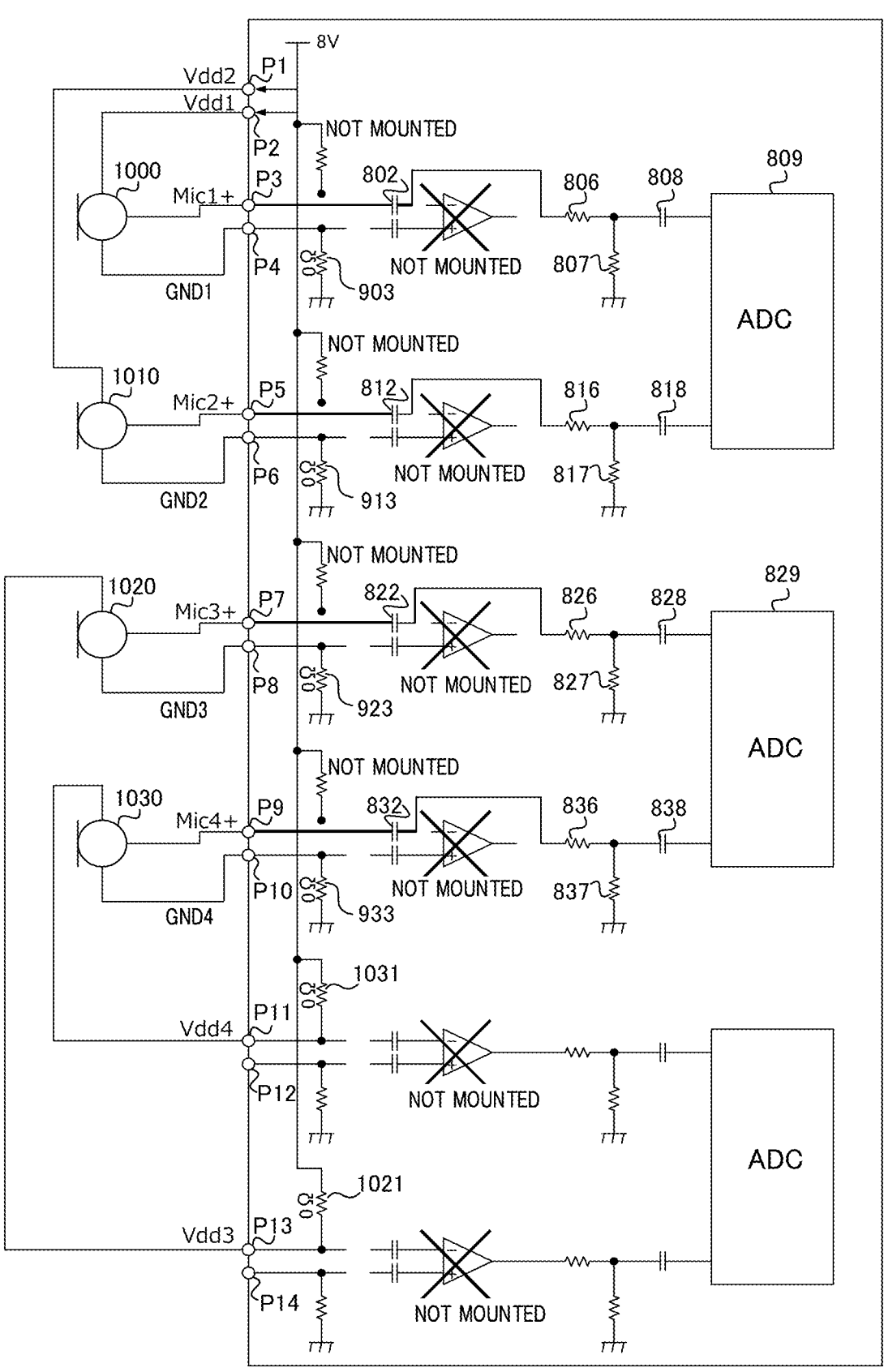
FIG. 10 illustrates a microphone interface of the present disclosure with four three-wire microphones connected thereto.

On the other hand, the microphone interface of the present disclosure illustrated in any one of FIGS. 8 to 10 can connect to up to six two-wire microphones or up to four three-wire microphones with 14 terminals.

The number of terminals in a microphone interface is small in the present disclosure, thereby reducing the size of the microphone interface. The microphone interface has a place for mounting a resistor, a capacitor, and a differential amplifier, for example, a place on a printed circuit board.

FIG. 8 illustrates a microphone interface of the present disclosure with six differential input two-wire microphones connected thereto. The microphone interface of the present disclosure is, for example, an in-vehicle microphone interface.

No microphone is connected to terminals P1 and P2 of the microphone interface.

Output line Mic1+ and output line Mic1− of first microphone 800 are respectively connected to terminals P3 and P4 of the microphone interface.

Output line Mic2+ and output line Mic2− of second microphone 810 are respectively connected to terminals P5 and P6 of the microphone interface.

Output line Mic3+ and output line Mic3− of third microphone 820 are respectively connected to terminals P7 and P8 of the microphone interface.

Output line Mic4+ and output line Mic4− of fourth microphone 830 are respectively connected to terminals P9 and P10 of the microphone interface.

Output line Mic5+ and output line Mic5− of fifth microphone 840 are respectively connected to terminals P11 and P12 of the microphone interface.

Output line Mic6+ and output line Mic6− of sixth microphone 850 are respectively connected to terminals P13 and P14 of the microphone interface.

Terminals P3, P5, P7, P9, P11, and P13 are respectively connected to one ends of first resistors 801, 811, 821, 831, 841, and 851 of 340Ω, and to one ends of first capacitors 802, 812, 822, 832, 842, and 852.

The other ends of first resistors 801, 811, 821, 831, 841, and 851 are all connected to an 8V power supply. The other ends of first capacitors 802, 812, 822, 832, 842, and 852 are respectively connected to the inverting inputs of differential amplifiers 805, 815, 825, 835, 845, and 855.

That is, terminals P3, P5, P7, P9, P11, and P13 are used as audio input terminals.

Terminals P4, P6, P8, P10, P12, and P14 are respectively connected to one ends of second resistors 803, 813, 823, 833, 843, and 853 of 340Ω, and to one ends of second capacitors 804, 814, 824, 834, 844, and 854.

The other ends of second resistors 803, 813, 823, 833, 843, and 853 are all grounded.

The other ends of second capacitors 804, 814, 824, 834, 844, and 854 are respectively connected to non-inverting inputs of differential amplifiers 805, 815, 825, 835, 845, and 855.

The outputs of differential amplifiers 805, 815, 825, 835, 845, and 855 are respectively connected to one ends of third resistors 806, 816, 826, 836, 846, and 856.

The other ends of third resistors 806, 816, 826, 836, 846, and 856 are respectively connected to one ends of fourth resistors 807, 817, 827, 837, 847, and 857, and to one ends of third capacitors 808, 818, 828, 838, 848 and 858.

The other ends of third capacitors 808 and 818 are respectively connected to the inputs of first analog digital converter 809. The other ends of third capacitors 828 and 838 are respectively connected to the inputs of second analog digital converter 829. The other ends of third capacitors 848 and 858 are respectively connected to the inputs of third analog digital converter 849.

For first resistors 801, 811, 821, 831, 841, and 851 and second resistors 803, 813, 823, 833, 843, and 853, resistors other than that of 340Ω may be used.

In addition, in FIG. 8, two microphones are connected to each of analog digital converter 809, 829, and 849; however, the number of microphones connected to each analog digital converter 809, 829, 849 is not necessarily be two. The numbers of microphones connected to analog digital converters 809, 829, and 849 may be different to each other.

FIG. 9 illustrates a microphone interface of the present disclosure with six single-ended input two-wire microphones connected thereto. The microphone interface of the present disclosure is, for example, an in-vehicle microphone interface.

No microphone is connected to terminals P1 and P2 of the microphone interface.

Output line Mic1+ and ground line GND1 of first microphone 900 are respectively connected to terminals P3 and P4 of the microphone interface.

Output line Mic2+ and ground line GND2 of second microphone 910 are respectively connected to terminals P5 and P6 of the microphone interface.

Output line Mic3+ and ground line GND3 of third microphone 920 are respectively connected to terminals P7 and P8 of the microphone interface.

Output line Mic4+ and ground line GND4 of fourth microphone 930 are respectively connected to terminals P9 and P10 of the microphone interface.

Output line Mic5+ and ground line GND5 of fifth microphone 940 are respectively connected to terminals P11 and P12 of the microphone interface.

Output line Mic6+ and ground line GND6 of sixth microphone 950 are respectively connected to terminals P13 and P14 of the microphone interface.

Terminals P3, P5, P7, P9, P11, and P13 are respectively connected to one ends of fifth resistors 901, 911, 921, 931, 941, and 951 of 680Ω, and to one ends of first capacitors 802, 812, 822, 832, 842, and 852.

The other ends of fifth resistors 901, 911, 921, 931, 941, and 951 are all connected to an 8V power supply.

The other ends of first capacitors 802, 812, 822, 832, 842, and 852 are respectively connected to one ends of third resistors 806, 816, 826, 836, 846, and 856.

The other ends of third resistors 806, 816, 826, 836, 846, and 856 are respectively connected to one ends of fourth resistors 807, 817, 827, 837, 847, and 857, and to one ends of third capacitors 808, 818, 828, 838, 848 and 858.

The other ends of fourth resistors 807, 817, 827, 837, 847, and 857 are all grounded.

The other ends of third capacitors 808 and 818 are both connected to first analog digital converter 809. The other ends of third capacitors 828 and 838 are both connected to second analog digital converter 829. The other ends of third capacitors 848 and 858 are both connected to third analog digital converter 849.

That is, terminals P3, P5, P7, P9, P11, and P13 are used as audio input terminals.

Terminals P4, P6, P8, P10, P12, and P14 are respectively connected to one ends of sixth resistors 903, 913, 923, 933, 943, and 953 of 0Ω.

The other ends of sixth resistors 903, 913, 923, 933, 943, and 953 are all grounded. Terminals P4, P6, P8, P10, P12, and P14 are thus all grounded.

In FIG. 9, two microphones are connected to each of analog digital converter 809, 829, and 849; however, the number of microphones connected to each of analog digital converter 809, 829, 849 is not necessarily be two. The numbers of microphones connected to analog digital converters 809, 829, and 849 may be different to each other.

FIG. 10 illustrates a microphone interface of the present disclosure with four three-wire microphones connected thereto.

Power supply line Vdd1, output line Mic1+, and ground line GND1 of first microphone 1000 are respectively connected to terminals P2, P3, and P4 of the microphone interface.

Power supply line Vdd2, output line Mic2+, and ground line GND2 of second microphone 1010 are respectively connected to terminals P1, P5, and P6 of the microphone interface.

Power supply line Vdd3, output line Mic3+, and ground line GND3 of third microphone 1020 are respectively connected to terminals P13, P7, and P8 of the microphone interface.

Power supply line Vdd4, output line Mic4+, and ground line GND4 of fourth microphone 1030 are respectively connected to terminals P11, P9, and P10 of the microphone interface.

No microphone is connected to terminals P12 and P14 of the microphone interface.

Each of power supply lines Vdd1, Vdd2, Vdd3, and Vdd4 of the microphones can be connected to any one of terminals of P1, P2, P11, and P13.

Terminals P1 and P2 are both connected to an 8V power supply.

Terminals P3, P5, P7, and P9 are respectively connected to one ends of first capacitors 802, 812, 822, and 832.

The other ends of first capacitors 802, 812, 822, and 832 are respectively connected to one ends of third resistors 806, 816, 826, and 836.

The other ends of third resistors 806, 816, 826, and 836 are respectively connected to one ends of fourth resistors 807, 817, 827, and 837, and to one ends of third capacitors 808, 818, 828, and 838.

The other ends of fourth resistors 807, 817, 827, and 837 are all grounded.

The other ends of third capacitors 808 and 818 are both connected to first analog digital converter 809. The other ends of third capacitors 828 and 838 are both connected to second analog digital converter 829.

That is, terminals P3, P5, P7, and P9 are set as audio input terminals.

Terminals P4, P6, P8, and P10 are respectively connected to one ends of sixth resistors 903, 913, 923, and 933 of 0Ω. The other ends of sixth resistors 903, 913, 923, and 933 are all grounded. Terminals P4, P6, P8, and P10 are thus all grounded.

Terminals P11 and P13 are respectively connected to one ends of seventh resistors 1031 and 1021 of 0Ω.

The other ends of seventh resistors 1031 and 1021 are both connected to the 8V power supply.

Terminals P11 and P13 are thus both connected to the 8V power supply. That is, terminals P11 and P13 are used as power supply terminals.

As described above, a microphone interface of the present disclosure includes the following: terminals P11 and P13 usable as audio input terminals into which audio signals are input (FIGS. 8 and 9), or as power supply terminals to be connected to a power supply (FIG. 10); and ground side terminals P12 and P14 provided on the ground side with respect to terminals P11 and P13. When a two-wire microphone is connected to the microphone interface, terminals P11 and P13 are used as audio input terminals (FIGS. 8 and 9), and when a three-wire microphone is connected to the microphone interface, terminals P11 and P13 are used as power supply terminals for supplying electric power to the three-wire microphone (FIG. 10).

As a result, a compact microphone interface that is commonly available regardless of microphone type can be provided.

When a single-end two-wire microphone(s), a differential input two-wire microphone(s), and a three-wire microphone(s) are connected to one interface, the connections illustrated in FIG. 8, FIG. 9, or FIG. 10 may be made for each terminal depending on the type of microphone to be connected.

For example, when a three-wire microphone is connected to terminals P2, P3, and P4, a three-wire microphone is connected to P1, P5, and P6, a differential input two-wire microphone is connected to terminals P7 and P8, a differential input two-wire microphone is connected to terminals P9 and P10, a single-ended input two-wire microphone is connected to terminals P11 and P12, and a single-ended input two-wire microphone is connected to terminals P13 and P14, the connection to terminals P1, P2, P3, P4, P5, and P6 may be as illustrated in FIG. 10, the connection to terminals P7, P8, P9, and P10 may be as illustrated in FIG. 8, and the connection to terminals P11, P12, P13, and P14 may be as illustrated in FIG. 9.

As illustrated in FIGS. 8 to 10, a microphone interface of the present disclosure allows connection of a two-wire microphone and also connection of a three-wire microphone. It is also possible to connect a mixture of two-wire microphones or three-wire microphones to the microphone interface.

As described above, a common microphone interface can be used by changing the internal resistance value of a microphone interface or not implementing a resistor in the microphone interface, or implementing or not implementing a differential amplifier depending on the type of microphone connected to the terminal. In addition, a common microphone interface for six two-wire microphones and four three-wire microphones can be configured with 14 terminals.

The microphone interface illustrated in FIGS. 8 to 10 is provided with 14 input terminals; however, the number of input terminals may be a multiple of seven.

For example, when a microphone interface is provided with seven input terminals, the microphone interface may have terminals P2, P3, P4, P7, P8, P13, and P14.

That is, when two-wire microphones are connected, a first microphone is connected to P3 and P4, a second microphone is connected to P7 and P8, and a third microphone is connected to P13 and P14. When three-wire microphones are connected, a first microphone is connected to P2, P3 and P4, and a second microphone is connected to P7, P8, and P13.

(1) A microphone interface according to an embodiment of the present disclosure includes: a connection terminal usable as an audio input terminal into which an audio signal is input or as a power supply terminal connected to a power supply; and a ground side terminal provided on a ground side with respect to the connection terminal. In the microphone interface, when a two-wire microphone is connected to the microphone interface, the connection terminal is used as the audio input terminal, and when a three-wire microphone is connected to the microphone interface, the connection terminal is used as the power supply terminal for supplying electric power to the three-wire microphone.

(2) A microphone interface according to an embodiment of the present disclosure is the microphone interface of item (1), in which: the two-wire microphone includes differential input two-wire microphones; each of the differential input two-wire microphones is connected to the connection terminal and the ground side terminal; the connection terminal is connected to the power supply via a first resistor; and the ground side terminal is grounded via a second resistor.

(3) A microphone interface according to an embodiment of the present disclosure is the microphone interface of item (2) further including: a first capacitor, a second capacitor, and a differential amplifier, each corresponding to a corresponding one of the differential input two-wire microphones, and the number of the differential input two-wire microphones is six; and an analog digital converter connected to an output of the differential amplifier. In the microphone interface, the connection terminal is connected to an inverting input of the differential amplifier via the first capacitor, the ground side terminal is connected to a non-inverting input of the differential amplifier via the second capacitor, one end of the first resistor is connected to a node between the connection terminal and the first capacitor, and one end of the second resistor is connected to a node between the ground side terminal and the second capacitor.

(4) A microphone interface according to an embodiment of the present disclosure is the microphone interface of item (1), in which: the two-wire microphone includes single-ended input two-wire microphones; each single-ended input two-wire microphone is connected to the connection terminal and the ground side terminal; the connection terminal is connected to the power supply via a third resistor; and the ground side terminal is grounded.

(5) A microphone interface according to an embodiment of the present disclosure is the microphone interface of item (4) further including: a capacitor corresponding to each single-ended input two-wire microphone, and the number of the single-ended input two-wire microphones is six; and an analog digital converter connected to one end of the capacitor. In the microphone interface, the connection terminal is connected to another end of the capacitor, and one end of the third resistor is connected to a node between the connection terminal and the other end of the capacitor.

(6) A microphone interface according to an embodiment of the present disclosure is the microphone interface of item (1) further including: a spare power supply terminal connected to the power supply. In the microphone interface, the three-wire microphone is connected to the spare power supply terminal, the connection terminal used as the audio input terminal, and the ground side terminal, or the three-wire microphone is connected to the connection terminal used as the power supply terminal, the connection terminal used as the audio input terminal, and the ground side terminal, and
  the ground side terminal is grounded.

(7) A microphone interface according to an embodiment of the present disclosure is the microphone interface of item (6) further including: an analog digital converter. In the microphone interface, the spare power supply terminal includes two spare power supply terminals, and the three-wire microphone includes four three-wire microphones, two of the four three-wire microphones are each connected to a corresponding one of the two spare power supply terminals, the connection terminal used as the audio input terminal, and the ground side terminal, and another two of the four three-wire microphones are each connected to the connection terminal used as the power supply terminal, the connection terminal used as the audio input terminal, and the ground side terminal.

(8) A microphone interface according to an embodiment of the present disclosure is the microphone interface of item (1), in which: the microphone interface is configured to be mounted in a vehicle.

(9) A vehicle according to an embodiment of the present disclosure is a vehicle equipped with the microphone interface of item (1).

(10) A method for connecting a microphone according to an embodiment of the present disclosure includes: using a connection terminal as an audio input terminal when the microphone to be connected is a two-wire microphone; and using the connection terminal as a power supply terminal when the microphone to be connected is a three-wire microphone.

(11) A method for producing a microphone interface according to an embodiment of the present disclosure includes: forming a connection terminal that allows connection of a two-wire microphone and a three-wire microphone thereto, and a ground side terminal to be provided on a ground side with respect to the connection terminal; and for the connection of the two-wire microphone, mounting the connection terminal as an audio input terminal, and for the connection of the three-wire microphone, mounting the connection terminal as a power supply terminal.

This application is entitled to and claims the benefit of Japanese Patent Application No. 2023-023758 filed on Feb. 17, 2023, the disclosure of which including the specification, drawings and abstract is incorporated herein by reference in its entirety.

INDUSTRIAL APPLICABILITY

The present disclosure is particularly advantageous for a microphone interface.

REFERENCE SIGNS LIST

800, 810, 820, 830, 840, 850, 900, 910, 920, 930, 940, 950, 1000, 1010, 1020, 1030 Microphone
P1 to P20 Terminal
805, 815, 825, 835, 845, 855 Differential amplifier
809, 829, 849 Analog digital converter

The invention claimed is:
1. A microphone interface, comprising:
a connection terminal usable as an audio input terminal into which an audio signal is input or as a power supply terminal connected to a power supply; and
a ground side terminal provided on a ground side with respect to the connection terminal,
wherein
when a two-wire microphone is connected to the microphone interface, the connection terminal is used as the audio input terminal, and when a three-wire microphone is connected to the microphone interface, the connection terminal is used as the power supply terminal for supplying electric power to the three-wire microphone,
the two-wire microphone comprises a differential input two-wire microphone,
the differential input two-wire microphone is connected to the connection terminal and the ground side terminal,
the connection terminal is connected to the power supply via a first resistor, and
the ground side terminal is grounded via a second resistor.

2. The microphone interface according to claim 1, further comprising:

a first capacitor, a second capacitor, and a differential amplifier, each corresponding to the differential input two-wire microphone; and an analog digital converter connected to an output of the differential amplifier, wherein the connection terminal is connected to an inverting input of the differential amplifier via the first capacitor, the ground side terminal is connected to a non-inverting input of the differential amplifier via the second capacitor, one end of the first resistor is connected to a node between the connection terminal and the first capacitor, and one end of the second resistor is connected to a node between the ground side terminal and the second capacitor.

3. The microphone interface according to claim 1, wherein the microphone interface is configured to be mounted in a vehicle.

4. A microphone interface, comprising:

a connection terminal usable as an audio input terminal into which an audio signal is input or as a power supply terminal connected to a power supply;

a ground side terminal provided on a ground side with respect to the connection terminal, wherein when a two-wire microphone is connected to the microphone interface, the connection terminal is used as the audio input terminal, and when a three-wire microphone is connected to the microphone interface, the connection terminal is used as the power supply terminal for supplying electric power to the three-wire microphone, the two-wire microphone comprises a plurality of single-ended input two-wire microphones, a first single-ended input two-wire microphone of the plurality of single-ended input two-wire microphones is connected to the connection terminal and the ground side terminal;

the connection terminal is connected to the power supply via a first resistor, the ground side terminal is grounded, the microphone interface further includes:

capacitors corresponding to the plurality of single-ended input two-wire microphones, the number of the plurality of single-ended input two-wire microphones is six; and analog digital converters connected to first ends of the capacitors, the connection terminal is connected to a second end of the capacitor corresponding to the first single-ended input two-wire microphone, and one end of the first resistor is connected to a node between the connection terminal and the second end of the capacitor corresponding to the first single-ended input two-wire microphone.

5. The microphone interface according to claim 4, wherein the microphone interface is configured to be mounted in a vehicle.

6. A microphone interface, comprising:

a plurality of connection terminals including connection terminals usable as audio input terminals into which audio signals are input and connection terminals usable as power supply terminals connected to a power supply;

a plurality of ground side terminals provided on a ground side with respect to the plurality of connection terminals;

two spare power supply terminals connected to the power supply; and an analog digital converter, wherein four three-wire microphones are connected to the microphone interface, two of the four three-wire microphones are each connected to a corresponding one of the two spare power supply terminals, a connection terminal of the plurality of connection terminals used as an audio input terminal, and a ground side terminal of the plurality of ground side terminals, and another two of the four three-wire microphones are each connected to a connection terminal of the plurality of connection terminals used as a power supply terminal, a connection terminal of the plurality of connection terminals used as an audio input terminal, and a ground side terminal of the plurality of ground side terminals.

7. The microphone interface according to claim 6, wherein the microphone interface is configured to be mounted in a vehicle.

8. A vehicle equipped with the microphone interface according to claim 1.

9. A vehicle equipped with the microphone interface according to claim 4.

10. A vehicle equipped with the microphone interface according to claim 6.

\* \* \* \* \*